United States Patent
Okabayashi et al.

(10) Patent No.: US 8,050,426 B2
(45) Date of Patent: Nov. 1, 2011

(54) DIGITAL MIXER APPARATUS AND EDITING METHOD THEREFOR

(75) Inventors: Masaaki Okabayashi, Hamakita (JP); Takamitsu Aoki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1230 days.

(21) Appl. No.: 11/179,124

(22) Filed: Jul. 11, 2005

(65) Prior Publication Data
US 2006/0015198 A1 Jan. 19, 2006

(30) Foreign Application Priority Data
Jul. 13, 2004 (JP) ................................. 2004-205984

(51) Int. Cl.
*H04B 1/00* (2006.01)
*H04B 1/20* (2006.01)
*G06F 17/00* (2006.01)
(52) U.S. Cl. ................................ 381/119; 369/4; 700/94
(58) Field of Classification Search .................. 381/119; 700/94; 369/4; 84/697
See application file for complete search history.

(56) References Cited

U.S. PATENT DOCUMENTS
2003/0059066 A1* 3/2003 Kohyama et al. ............. 381/119

OTHER PUBLICATIONS
Yamaha CS1D, Control Surface, PM1D Digital Audio Mixing System, Owner's Manual, Yamaha Corporation, Japan; Title page, pp. 10, 11, 13-17, 74.

* cited by examiner

*Primary Examiner* — Devona Faulk
*Assistant Examiner* — George Monikang
(74) *Attorney, Agent, or Firm* — Morrison & Foerster LLP

(57) ABSTRACT

Mixer apparatus includes: a plurality of input channels, mixing buses and output channels; a monitor section that outputs, for a monitoring purpose, signals of one or more of the channels selected in response to monitoring selecting operation; and a plurality of effecters. For each of the plurality of effecters, setting is performed to insert the effecter in a designated one of the input or output channels, to allow the inserted effecter to be used in the designated channel. The mixer also permits editing of a selected one of the effecters while causing an editing screen for the selected effecter to be displayed. When any one of the effecters has been selected for editing while the mixer is set in the interlock mode, control is performed to automatically output, for the monitoring purpose, the signal of the channel having the selected effecter inserted therein.

10 Claims, 6 Drawing Sheets

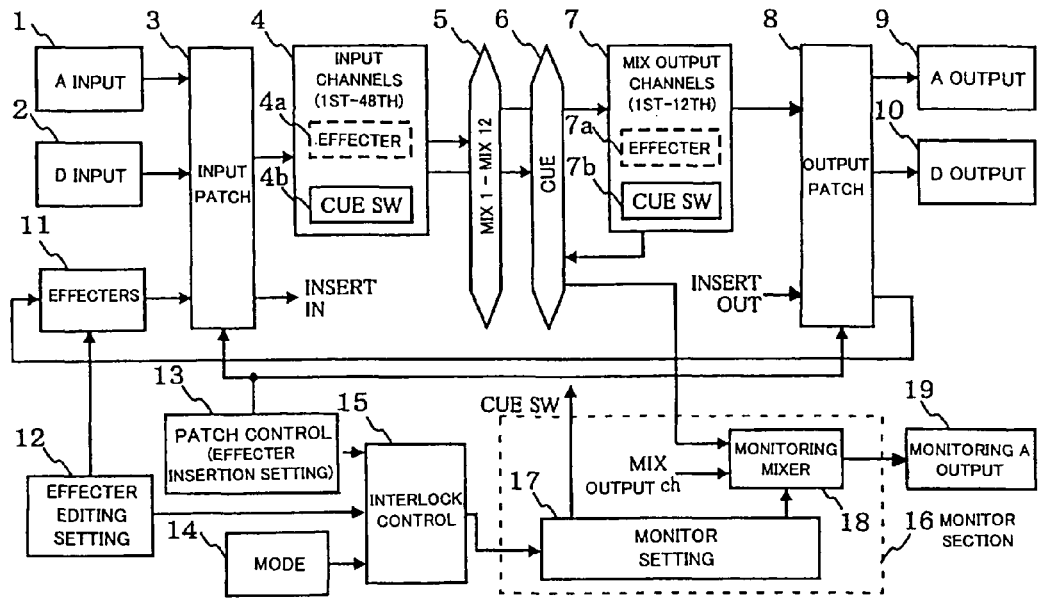
FIG. 1
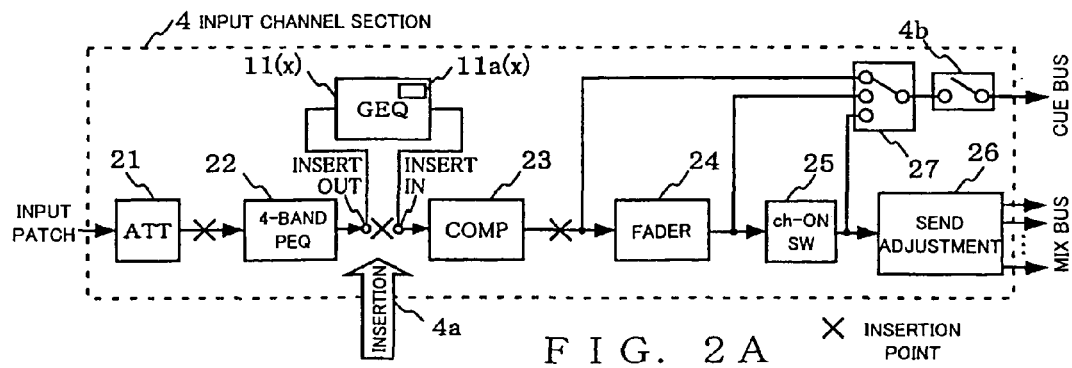
FIG. 2A    × INSERTION POINT
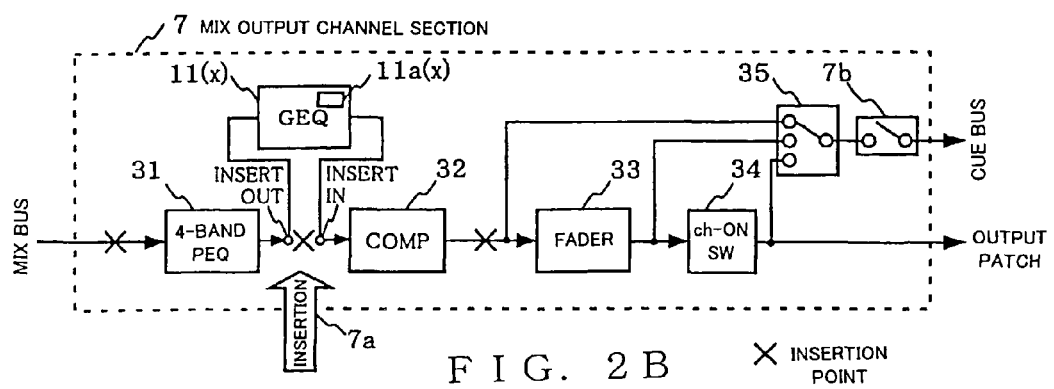
FIG. 2B    × INSERTION POINT

DIGITAL MIXER APPARATUS AND EDITING METHOD THEREFOR

BACKGROUND OF THE INVENTION

The present invention relates to digital mixer apparatus provided with effecters, and editing methods for use in the digital mixer apparatus.

Digital mixers have been known, for example, from "CS1D Operating Manual (Basic Operation Edition) (Software Edition) Ver.1 41", published by Yamaha Corporation, which is available online from the Internet (http://www2.yamaha.co.jp/manual/pdf/pa/japan/mixers/CS1DJ.pdf). In the known digital mixers, audio signals of a plurality of channels are input individually to a plurality of input signal processing sections (hereinafter referred to as "input channel sections"), then digital mixing is performed among signals of the individual input channel sections, and then the resultant mixed signals are output via one or more mix output signal processing sections (hereinafter referred to as "mix output channel sections").

In the digital mixing, a human operator can insert an internal or external effecter in any desired one of the input channel sections and/or mix output channel sections, to impart any one of various effects to the audio signal.

The human operator can call an editing screen for the effecter onto a display device to thereby edit parameters of the effecter. In such a case, the human operator sometimes wants to monitor each signal having passed through the effecter being edited, so as to know characteristics of the signal. Particularly, when the human operator has selected a predetermined effecter to be edited (i.e., as an object of editing), he or she wants to monitor each signal having passed through the selected effecter. For this purpose, the human operator has to first ascertain the channel having the effecter inserted therein and then set monitor means so that each signal of the channel can be monitored or cued (i.e., CUE-monitored); therefore, the operation to be performed by the human operator tends to be very complicated. Especially, where operating portions of the channel sections are constructed as "layered channel strips" due to a limited size of a control panel, a CUE-ON switch of a desired one of the channels can not be operated unless the human operator appropriately switches between the layers.

SUMMARY OF THE INVENTION

In view of the foregoing, it is an object of the present invention to provide an improved digital mixer apparatus having an interlock mode which not only permits, in response to (i.e., in an interlocked relation with) object-of-editing selecting operation, automatic monitoring of a signal of a channel section having an effecter inserted therein, but also permits, in response to (i.e., in an interlocked relation with) object-of-monitoring selecting operation, monitoring of a signal of a desired channel as in the conventional digital mixer apparatus, as well as an editing method for use in the digital mixer apparatus.

In order to accomplish the above-mentioned object, the present invention provides a digital mixer apparatus including a plurality of input channels and arranged to mix signals processed in the individual input channels, which comprises: a monitor section that outputs, for a monitoring purpose, the signals of one or more input channels selected, in response to monitoring selecting operation, from among the plurality of input channels; a plurality of effecters; an effecter insertion setting section that, for each of the plurality of effecters, performs setting to insert the effecter in an input channel designated, in response to insertion designating operation, from among the plurality of input channels, to allow the inserted effecter to be used in the designated input channel; an editing section that edits an effecter selected, in response to object-of-editing selecting operation, from among the plurality of effecters while causing an editing screen for the selected effecter to be displayed on a display; a mode setting section that sets either an interlock mode or a non-interlock mode; and an interlock control section that, when any one of the effecters has been selected via the editing section in response to the object-of-editing selecting operation while the digital mixer apparatus is set in the interlock mode, controls the monitor section to automatically output, for the monitoring purpose, the signal of the input channel having the selected effecter inserted therein.

According to the present invention, the digital mixer apparatus has the function for, irrespective of whether the apparatus is set in the interlock mode or in the non-interlock mode, monitoring (cuing or CUE-monitoring) a desired one of the input channels in response to object-of-monitoring selecting operating by a human operator as in the conventional digital mixer apparatus. In addition to such a conventional function, the digital mixer apparatus of the present invention has the function that, while the apparatus is set in the interlock mode and only if one of the plurality of effecters is selected as an object of editing, permits automatic monitoring (CUE-monitoring) of an input channel having the selected effecter inserted therein. Namely, with no particular object-of-monitoring selecting operation performed, the signal of the input channel can be automatically output for the monitoring purpose. Therefore, the present invention can significantly simplify the operation necessary for automatically monitoring the signal having passed through the selected effecter. Even when a setting has been made such that a signal of the input channel before passing through the effecter is output for the monitoring purpose, operation for changing the setting such that a signal having passed through the effecter is output for the monitoring purpose can be performed with utmost ease. Further, while the digital mixer apparatus is set in the non-interlock mode, the state of the CUE-monitoring does not change in response to selection of an effecter as an object of editing, as in the conventional digital mixer apparatus: consequently, the digital mixer apparatus of the invention can be handled or used with a same feeling as the conventional digital mixer apparatus.

Therefore, the present invention achieves the benefits that, by the digital mixer apparatus being only set to the interlock mode, the signal of the input channel having the selected effecter inserted therein can be automatically monitored in an interlocked relation with the object-of-editing selecting operation and that signals of one or more channels can be automatically monitored in response to object-of-monitoring selecting operation by the human operator as in the conventional digital mixer apparatus. By being just set to the non-interlink mode, the apparatus can be used with a same feeling as the conventional digital mixer apparatus.

According to another aspect of the present invention, there is provided a digital mixer apparatus including a plurality of input channels, a plurality of mixing buses and a plurality of output channels corresponding to the mixing buses, the digital mixer apparatus mixing, via the mixing buses, signals processed in the individual input channels and outputting the mixed signals via the output channels corresponding to the mixing buses, which comprises: a monitor section that outputs, for a monitoring purpose, the signals of one or more channels selected, in response to monitoring selecting operation, from among of the plurality of input channels and the plurality of output channels; a plurality of effecters; an effecter insertion setting section that, for each of the plurality of effecters, performs setting to insert the effecter in a channel designated, in response to insertion designating operation, from among the plurality of input channels and the plurality of output channels, to allow the inserted effecter to be used in the designated channel; an editing section that edits an effecter selected, in response to object-of-editing selecting operation, from among the plurality of effecters while causing an editing screen for the selected effecter to be displayed on a display; a mode setting section that sets either an interlock mode or a non-interlock mode; and an interlock control section that, when any one of the effecters has been selected via the editing section in response to the object-of-editing selecting operation while the digital mixer apparatus is set in the interlock mode, controls the monitor section to automatically output, for the monitoring purpose, the signal of the channel having the selected effecter inserted therein. Thus, even when the selected effecter is inserted in any one of the output channels, the present invention can achieve the same benefits as discussed above.

As an example, the insertion designating operation via the effecter insertion setting section can also instruct, for a given one of the effecters, that the given effecter should not be inserted in any one of the input channels. Even when one of the effecters has been selected via the editing section while the digital mixer apparatus is set in the interlock mode, the interlock control section does not perform automatic output control on the monitor section if the selected effecter is not inserted in any one of the input channels. Thus, even in the interlock mode, the monitoring (CUE-monitoring) state can be prevented from changing, despite the selection of the effecter, if the selected effecter has not been inserted in any one of the input and output channels.

As an example, the functional ON/OFF state of each of the effecters can be controlled by a human operator. While the digital mixer apparatus is set in the interlock mode, the interlock control section controls the monitor section to automatically output, for the monitoring purpose, the signal of the input channel having the selected effecter inserted therein, irrespective of whether the function of the effecter selected via the editing section in response to the object-of-editing selecting operation is ON or OFF. With such arrangements, it is possible to readily ascertain how the signal changes due to the insertion of the effecter selected in response to the object-of-editing selecting operation, which greatly facilitates editing of the effecter.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which:

FIG. 1 is a block diagram showing signal processing or functions performed by a digital mixer apparatus in accordance with an embodiment of the present invention;

FIGS. 2A and 2B are block diagrams showing signal processing sections of an input channel section and a mix output channel section shown in FIG. 1;

DETAILED DESCRIPTION OF THE INVENTION

Figure 3:
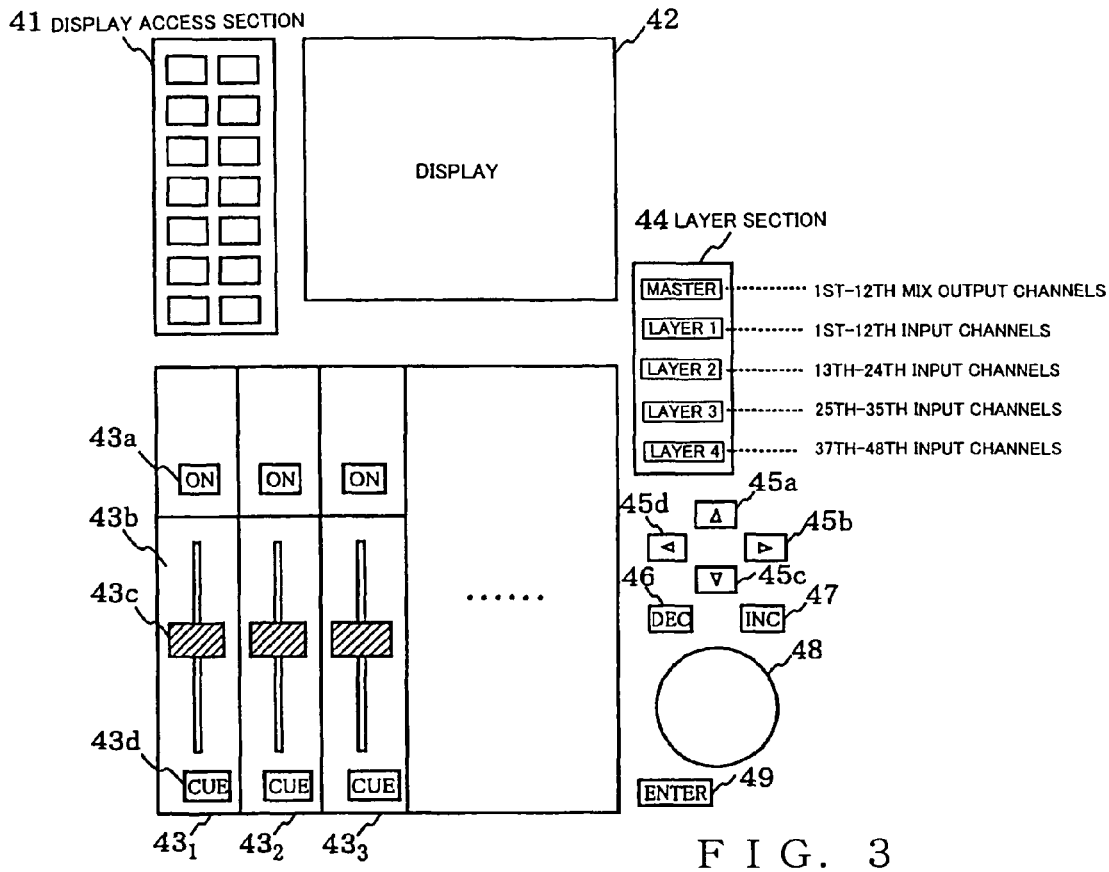
FIG. 3 is a diagram showing a part of a control panel employed in the embodiment of FIG. 1.

FIG. 1 is a block diagram showing signal processing or functions performed by a digital mixer apparatus in accordance with an embodiment of the present invention.

The digital mixer apparatus of FIG. 1 controls characteristics of input signals by means of a plurality of input channel sections 4, then mixes the output signals from the input channel sections 4 by means of a plurality of mix output channel sections 7, and then outputs the resultant mixed signals after controlling the characteristics of the signals.

As shown in FIG. 1, the digital mixer apparatus of the present invention includes an analog ("A") input section that receives analog signals via a plurality of input terminals and then outputs the received signals after converting the signals into digital representation (A/D conversion). The digital mixer apparatus also includes a digital ("D") input section that receives digital signals via a plurality of input terminals and then outputs the received digital signals.

Further, in the digital mixer apparatus, an input patch section 3 is controlled by a patch control section 13 to selectively couple each of the plurality of outputs from the input sections (A and D input sections 1 and 2) to at least one of inputs of 48 channels of the input channel sections 4; that is, each one of the outputs from the input sections can be coupled to two or more input channel sections 4.

In addition, the input patch section 3 performs line connection for inserting individual effecters 11(x) (e.g., x=1, 2, 3, ..., 12) of an effecter section 11 in insertion positions of desired ones of the plurality of input channel sections 4 or the plurality of output channel sections 7.

Each of the input channel sections 4 controls the characteristics of each input signal and selectively outputs the thus-controlled signal to at least one of a plurality of (e.g., 12) mix buses 5, where mixing is performed among the signals from the input channel sections 4. Mixed signals from the individual mix buses 5 are output to the plurality of mix output channel sections 7 that correspond to the mix buses 5 on a one-to-one basis. The mix output channel sections 7 control characteristics of the mixed signals from the mix buses 5 and outputs the thus-controlled signals to an output patch section 8.

The output patch section 8 is controlled by the patch control section 13 to selectively couple each of the plurality of outputs of 12 channels of the output put sections 7 to at least one of inputs of analog ("A") and digital ("D") output channel sections 9 and 10; that is, the output from each one of the mixing output sections 7 can be coupled to two or more of the inputs of the output channel sections.

In addition, the output patch section 8 performs line connection for inserting the individual effecters 11(*x*) of the effecter section 11 in insertion positions of desired ones of the plurality of input channel sections 4 or the plurality of output channel sections 7.

The A output section 9 outputs a plurality of digital signals to respective output terminals after converting the signals into analog representation (D/A conversion). The D output section 10 directly outputs a plurality of digital signals to respective output terminals.

For simplification of description, let is be assumed here that the effecter section 11 comprises a plurality of (e.g., 12) effecters 11(*x*) of a same type (such as monaural graphic equalizers). Where the effecters are external effecters, they are connected to the input patch section 3 and output patch section 8 via external terminals.

In which of the input channel sections 4 or mix output channel sections 7 and in which of positions of signal paths of the channel section each of the effecters 11(*x*) is to be inserted may be set in response to insertion-destination selecting operation by a human operator. Note that, in each of the signal paths, there are provided an insertion-out point and insertion-in point for insertion of a selected effecter.

When, in the illustrated example, a certain one of the effecters 11(*x*) is to be inserted in a desired insertion position 4*a* or 7*a*, the effecter insertion is carried out by the patch control section 13 controlling the line connections in the input patch section 3 and output patch section 8.

However, each of the effecters 11(*x*) has an effecter-ON switch 11*a*(*x*) as will be later described in relation to FIG. 2, and thus, each inserted effecter 11(*x*) is allowed to function, only when the corresponding effecter-ON switch 11*a*(*x*) is ON; that is, when the corresponding effecter-ON switch 11*a*(*x*) is OFF, the inserted effecter 11(*x*) is placed in a "through" state, i.e. it is disconnected so that the input side of the effecter 11(*x*) is directly coupled to the output side of the effecter 11(*x*).

Each of the input channel sections 4 and mix output channel sections 7 includes a CUE switch 4*b* or 7*b*, so that, when the corresponding CUE switch 4*b* or 7*b* is ON, the channel section 4 or 7 in question outputs a signal, present in a given take-out position (i.e., CUE point) of its signal path, to a CUE bus 6.

Monitor section 16 shown in FIG. 1 includes a monitor setting section 17 and monitoring mixer 18. Setting of the CUE switches 4*b* and 7*b* is performed in response to object-of-CUE-monitoring selecting operation by the human operator. One or more signals are mixed by the CUE bus 6, and the thus-mixed signals are supplied to the monitoring mixer 18.

In the monitoring mixer 18, normal monitoring signals, such as one or more of the output signals from the output channel sections 7 to the output patch section 8, are selectively mixed. Selection of the monitoring signals is made via the monitor setting section 17 in response to object-of-monitoring selecting operation by the human operator. The monitoring signals are supplied from the monitoring mixer 18 to a monitoring analog signal ("A") output section 19, where the signals are converted into analog representation via a D/A converter and then supplied to a human operator's monitor device (e.g., speaker or headphone).

After CUE-monitoring has been set, signals supplied from the CUE bus 6 are output as monitoring signals in place of normal monitoring signals, as set forth below. Let it be assumed here that any one of the CUE switches 4*b* of the input channel sections 4 or any one of the CUE switches 7*b* of the mix output channel sections 7 has been turned on in response to object-of-CUE-monitoring selecting operation by the human operator, while signals selected by object-of-monitoring selecting operation are being monitored. Then, the monitoring mixer 18 is controlled so that signals having so far been supplied to the human operator's monitor, such as signals from the mix output sections 7, are turned off or attenuated and consequently signals from the CUE bus 6 are output in place of the so-far supplied signals.

Hereinafter, the normal monitoring state where signals selected, as objects of monitoring, by the monitor setting section 17 will be referred to as "CUE-OFF" state, while a state where signals from the CUE bus 6 are being monitored with the above-mentioned selected signals turned off or attenuated will be referred to as "CUE-ON (or CUE ACTIVE)" state.

There may be provided output terminals dedicated to the CUE monitoring, in which case mixed signals from the CUE bus 6 are always output to the dedicated output terminals rather than to the monitoring A output section 19.

Characteristics of each of the effecters 11 can be edited by the human operator. When an effecter editing setting section 12 is ON, an editing screen for a desired one of the effecters is displayed on a not-shown display. Any one of the plurality of effecters 11 to be edited is set, as an object of editing, in response to object-of-editing selecting operation by the human operator. The human operator can change parameter settings of the effecter while viewing the display.

Mode section 14 shown in FIG. 1 sets either an interlock mode or a non-interlock mode in response to mode selecting operation by the human operator.

When, in the interlock mode, a predetermined effecter (hereinafter sometimes referred to as "effecter in question") 11(*x*) has been selected via the effecter editing setting section 12 in response to object-of-editing selecting operation by the human operator, an interlock control section 15 controls the monitor section 16 (monitor setting section 17) to thereby control the CUE switch 4*b* or 7*b* so that a signal in the signal path of the channel section (input channel section 4 or output channel section 7), having the effecter in question 11(*x*) inserted therein, is output to the CUE bus 6 and the signal is then supplied to the monitoring mixer 18 as a CUE monitoring signal (interlocked-CUE-monitoring signal).

The information as to which of the channel sections the effecter in question 11(*x*) is inserted in (i.e., information indicative of an insertion destination channel for the selected effecter 11(*x*)) is obtainable from the patch control section (effecter insertion setting section) 13.

The monitoring mixer 18 outputs the CUE-monitoring signals in priority to the normal monitoring signals. Thus, the signal in the signal path of the channel section, having the effecter in question 11(*x*) inserted therein, is output from the monitoring A output section 19 and supplied to the human operator's monitor.

While the digital mixer apparatus is in the non-interlock mode, on the other hand, the interlock control section 15 does not perform control on the monitor setting section 17 even when the effecter in question 11(*x*) has been selected in response to object-of-editing selecting operation via the effecter editing setting section 12.

In the interlock mode as well as in the non-interlock mode, the monitor setting section 17 causes the signal in the signal path of the channel section, selected in response to object-of-normal-monitoring selecting operation or object-of-CUE-monitoring-selecting operation by the human operator, to be output from the monitoring A output section 19 via the monitoring mixer 18, as in the conventional digital mixer apparatus, except when it is controlled by the interlock control section 15.

As stated above, when the effecter in question 11(*x*) has been selected in response to object-of-editing selecting operation while the mixer apparatus is set in the interlock mode, the editing screen for the effecter in question 11(*x*) is displayed on a not-shown display, and also the human operator is allowed to ascertain, via the human operator's monitor, a tone of the audio signal processed by the effecter in question 11(*x*) on the basis of parameters of the effecter. Consequently, in this case, the human operator does not have to perform object-of-CUE-monitoring selecting operation or object-of-monitoring selecting operation. When the digital mixer apparatus is to be handled or used with the same operating feel as in the conventional digital mixer apparatus, it is only necessary to set the digital mixer apparatus to the non-interlock mode.

At that time, the monitor setting section 17 may be set automatically so that desired monitoring is carried out not only when the effecter-ON switch 11*a*(*x*) of the selected effecter 11(*x*) is in the ON state but also when the effecter-ON switch 11*a*(*x*) is in the OFF state and thus the effecter in question 11(*x*) is not functioning.

The parameter editing screen for the selected effecter 11(*x*) includes a button (see 77 in FIG. 5) for turning on/off the effecter-ON switch 11*a*(*x*), and thus, even when the effecter-ON switch 11*a*(*x*) is OFF, it is very easy to turn on the switch 11*a*(*x*).

Further, in the instant embodiment, the human operator can edit the parameters of the selected effecter while monitoring and ascertaining an effect of the selected effecter while alternately switching between the ON and OFF states of the effecter-ON switch 11*a*(*x*).

FIG. 2A is a block diagram showing a signal processing section of each one of the input channel sections 4 shown in FIG. 1, and FIG. 2B is a block diagram showing a signal processing section of each one of the mix output channel sections 7. In the following description, it is assumed that the effecter 11(*x*) is a graphic equalizer (GEQ).

First, a description will be given about signal paths in FIG. 2A when the effecter 11(*x*) is not inserted.

Signal delivered from the input patch section 3 to the input channel section 4 is adjusted in level via an attenuator (ATT) 21. Then, frequency characteristics of the signal are adjusted via a four-band parametric equalizer (PEQ) 22.

Compressor (COMP) 23 detects the level of the input signal and performs amplitude compression of the signal on the basis of the detected level, so that the gain of the signal when the signal has a relatively great level is lowered as compared to when the signal has a relatively small level.

Fader section 24 performs level adjustment for subsequent mixing processing. Channel (ch)-ON switch 25 controls ON/OFF of output from the input channel section 4.

Further, a send (i.e., signal delivery) adjustment section 26, associated with the individual buses, performs ON/OFF control and adjustment of supply (or send) levels to the individual mix buses 5. In some case, panning control is performed to adjust a gain ratio between output signals to be supplied to a certain pair of the mix buses 5.

Next, when a certain effecter 11(*x*) is to be inserted in any one of the signal paths in FIG. 2A, the effecter 11(*x*) is inserted in an insertion position 4*a* selected from a plurality of insertion points (each indicated by a "X" mark) preset in the signal paths of the channel selection. The signal path in question of the input channel section is cut or divided at the insertion position 4*a*. Output from the insertion-out point immediately preceding the insertion position 4*a* is coupled, by the output patch section 8, to the input of the effecter 11(*x*), and an output from the effecter 11(*x*) is coupled, by the input patch section 3, to the input side of the insertion-in point immediately following the insertion position 4*a*.

The effecter 11(*x*) includes the effecter-ON switch 11*a*(*x*), so that, even when the effecter 11(*x*) is inserted, only turning off the effecter-ON switch 11*a*(*x*) can deactivate the function of the effecter 11(*x*) into provide a same state as when the effecter 11(*x*) is not inserted; that is, by turning off the effecter-ON switch 11*a*(*x*), the effecter 11(*x*) can be controlled to directly connect its input and output so that the signal passes through the effecter 11(*x*) from the insertion-out point directly to the insertion-in point.

When the effecter-ON switch 11*a*(*x*) is ON, the input channel section, having been set as an insertion destination for the effecter 11(*x*), supplies the output signal from a block immediately preceding the set insertion position 4*a* to the effecter 11(*x*), so that the effecter 11(*x*) imparts an effect to the signal and the resultant effect-imparted signal is supplied to a block immediately following the set insertion position 4*a*.

In a CUE setting switch 27, front and rear positions of the fader section 24, rear position of the ch-ON switch 25, etc. in each of the input channel sections 4 are set as CUE points in accordance with CUE point settings in the monitor setting section 17. Thus, the signal is supplied via the CUE switch 4*b* to the CUE bus 6. The CUE point setting operation may be performed independently for each of the input channel sections 4 or collectively for all of the input channel sections 4.

The foregoing description also applies to the output channel section 7 shown in FIG. 2B. Note, however, that the output signal from the output channel section 7 is delivered to the output patch section 8, not to the mix buses 5, and thus, the output channel section 7 does not include the send adjustment section. Front and rear positions of the fader section 33, rear position of the ch-ON switch 34, etc. in each of the output channel sections 7 are selectable as CUE points, and a signal from any one of the CUE points, selected via a CUE setting switch 35, is supplied via the CUE switch 7*b* to the CUE bus 6.

FIG. 3 is a diagram showing a part of a control panel employed in the embodiment of FIG. 1, where illustration of operators irrelevant to the present invention is omitted.

In the figure, reference numeral 41 represents a display access section, which includes a plurality of switches corresponding to a plurality of different parameter editing screens. Once the human operator operates any one of the switches, a display 42 displays one of the parameter editing screens which corresponds to the operated switch.

$43_1$, $43_2$, $43_3$, . . . , represent a plurality of (12 in the illustrated example) channel (ch) strips. As the human operator operates one of a plurality of layer switches, i.e. "Master", "Layer 1", "Layer 2", . . . and "Layer 4", provided in a layer section 44, some of the channel sections (input channel sections 4 or mix output channel sections 7) are assigned to the ch strips $43_1$, $43_2$, $43_3$, . . . .

Namely, when the "Master" layer is selected, the 1st-12th mix output channels are assigned to the ch strips $43_1$, $43_2$, $43_3$, ..., and when "Layer 1"-"Layer 4" are selected, the 1st-12th input channels to the 37th-48th input channels are assigned to the ch strips $43_1$, $43_2$, $43_3$, ..., respectively.

Each of the ch strips $43_1$, $43_2$, $43_3$, ..., has same operators, and thus, the following paragraphs representatively describe the operators provided in one of the ch strips $43_1$ alone.

$43_a$ represents an operator corresponding to the ch-ON switch 25 or 34 shown in FIG. 2. $43_b$ represents a channel (ch) fader for controlling a level of a signal assigned thereto and $43_c$ represents a knob of the ch fader $43_b$.

$43_d$ represents a CUE switch corresponding to the switch 4b or 7b shown in FIG. 2. This CUE switch $43_d$ is a self-illuminated switch; namely, the CUE switch $43_d$ of each channel for which the CUE switch is ON is illuminated with the CUE switch $43_d$ of each channel for which the CUE switch is OFF is kept deilluminated.

The CUE function is activated in either a "last CUE" mode or a "mix CUE" mode. The following paragraphs describe the CUE function in the "last CUE" mode.

Once, in the CUE-OFF state, the CUE switch 43d of any one of the ch strips (e.g., ch strip $43_1$) is operated, i.e. the channel assigned to the one ch strip (e.g., the 1st input channel when "Layer 2" is selected) is selected as an object-of-CUE-monitoring, the monitoring mixer 18 is shifted from the "CUE-OFF" state to the "CUE-ON" state, and the CUE switch 4b or 7b (e.g., CUE switch 4b) of the selected channel (i.e., 1st input channel) is turned on.

Further, once, in the CUE-ON state, the CUE switch 43d of any one of the ch strips (e.g., ch strip $43_2$) where the CUE switch 43d is OFF is operated, i.e. another channel (e.g., second input channel) different from the channel so far selected as the object-of-CUE-monitoring (e.g., first input channel) is selected, the CUE switch 4b or 7b of the so-far selected channel (e.g., 1st input channel) is turned off, while the CUE switch 4b or 7b (e.g., CUE switch 4b) of the newly-selected channel (e.g., 2nd input channel) is turned on.

Furthermore, once, in the CUE-ON state, the CUE switch 43d of any one of the ch strips (e.g., ch strip $43_1$) where the CUE switch 43d is ON is operated, i.e. the channel so far selected as the object-of-CUE-monitoring (e.g., the 1st input channel when "Layer 2" is selected) is again selected, the CUE switch 4b or 7b (e.g., CUE switch 4b) of the so-far selected channel is turned off, and the monitoring mixer 18 is shifted from the "CUE-ON" state to the "CUE-OFF" state. Namely, as the same CUE switch 43d is operated twice in succession, the corresponding CUE switch 4b or 7b (e.g., CUE switch 4b) is turned on and off in a toggle-like manner.

Reference numerals $45_a$-$45_d$ represent cursor switches, which are pointing devices for pointing to visual indications on the display 42; more specifically, the cursor switches function to move a cursor placed in an entry frame for a numerical value or text and move a focus or the like to a button-type or fader-type operator. In addition to or in place of these cursor switches, there may be provided pointing devices, such as a touchpad and/or mouse.

Decrement (DEC) switch 46 and increment (INC) switch 47 are operable to decrease or increase a numerical value designated by any of the pointing devices, turn on or off a designated button type operator or vary an operating amount of a designated fader type operator so as to set a corresponding parameter value.

Reference numeral 48 represents a rotary encoder (i.e., parameter wheel) for decreasing or increasing a designated numerical value or operating a designated operator so as to set a corresponding parameter value ENTER switch 49 is operable to turn on/off a designated button-type operator to set a corresponding parameter value or open a popup window of a designated operator.

Figure 4:
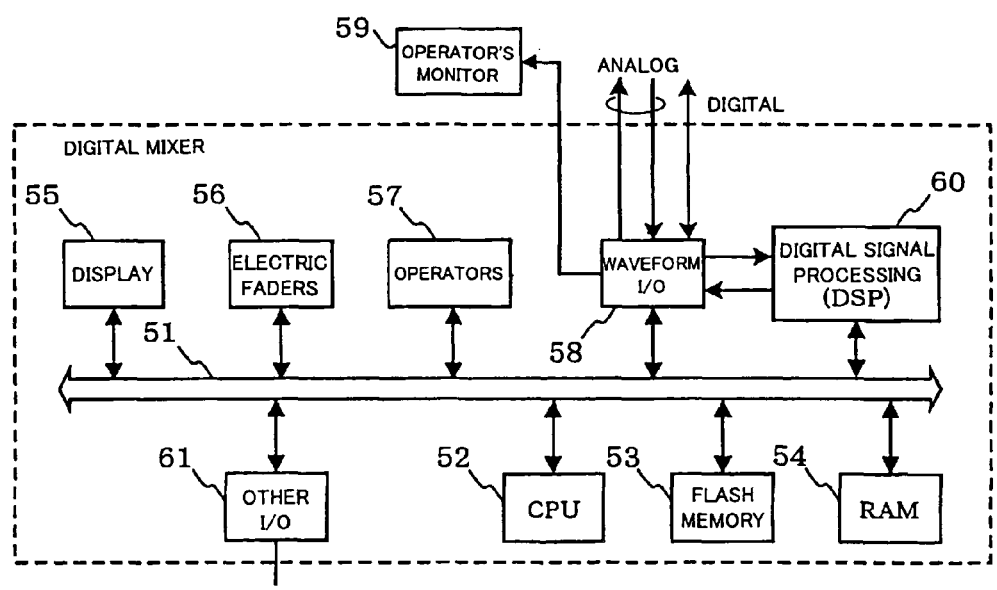
FIG. 4 is a block diagram showing an example hardware setup of the digital mixer apparatus for performing signal processing or functions.

FIG. 4 is a block diagram showing an example hardware setup of the digital mixer apparatus for performing the signal processing or functions of FIG. 1.

In the figure, reference numeral 51 represents a bus, and 52 a CPU (Central Processing Unit). 53 represents a flash memory where a control program and preset data are rewritably stored. The control program may be executed after being loaded into a RAM (Random Access Memory) 54.

The CPU 52 executes the control program to not only implement the effecter editing setting section 12, patch control section 13, mode section 14, interlock control section 15, monitor setting section 17, etc. but also control the entire digital mixer apparatus.

The RAM 54 includes a working memory area, which has a current memory region that stores operation data for controlling current operation of the digital mixer apparatus; the operation data include current values of various parameters, such as parameters of the effecters, set via various operators on the control panel shown in FIG. 3.

Further, reference numeral 55 in FIG. 4 represents a display section that includes the display 42 of FIG. 3, CUE switches 4b and 7b of FIGS. 1 and 2 (CUE switches 43d in FIG. 3) and light emitting diodes. 56 represents electric faders corresponding to the ch faders 43c shown in FIG. 3, and 57 represents a group of other operators.

Further, reference numeral 58 represents a waveform input/output interface section that receives and transfers, from outside the mixer apparatus, an analog or digital waveform signal to a digital signal processing section (DSP) 60 and outputs, to the outside, a signal received from the DSP 60. The waveform input/output interface section 58 includes the A input section 1, D input section 2, A output section 9, D output section 10, monitoring A output section 19, etc. shown in FIG. 1.

59 represents a human operator's monitor that receives, via the monitoring A output section 19 within the waveform input/output interface section 58, a monitoring signal output from the DSP 60 and passes the received monitoring signal to a speaker or headphones for monitoring by the human operator.

The DSP 60 performs signal processing functions represented by the input patch section 3, input channel sections 4, mix buses 5, CUE bus 6, mix output channel sections 7, output patch section 8, monitoring mixer 18, etc. shown in FIG. 1.

61 represents another input/output interface section that allows the human operator to remote-control, using a mouse or the like, behavior of the main body of the digital mixer apparatus, shown in FIG. 4, on a screen displayed on an externally-connected personal computer through activation, on the personal computer, of a control application of the mixer apparatus.

Figure 5:
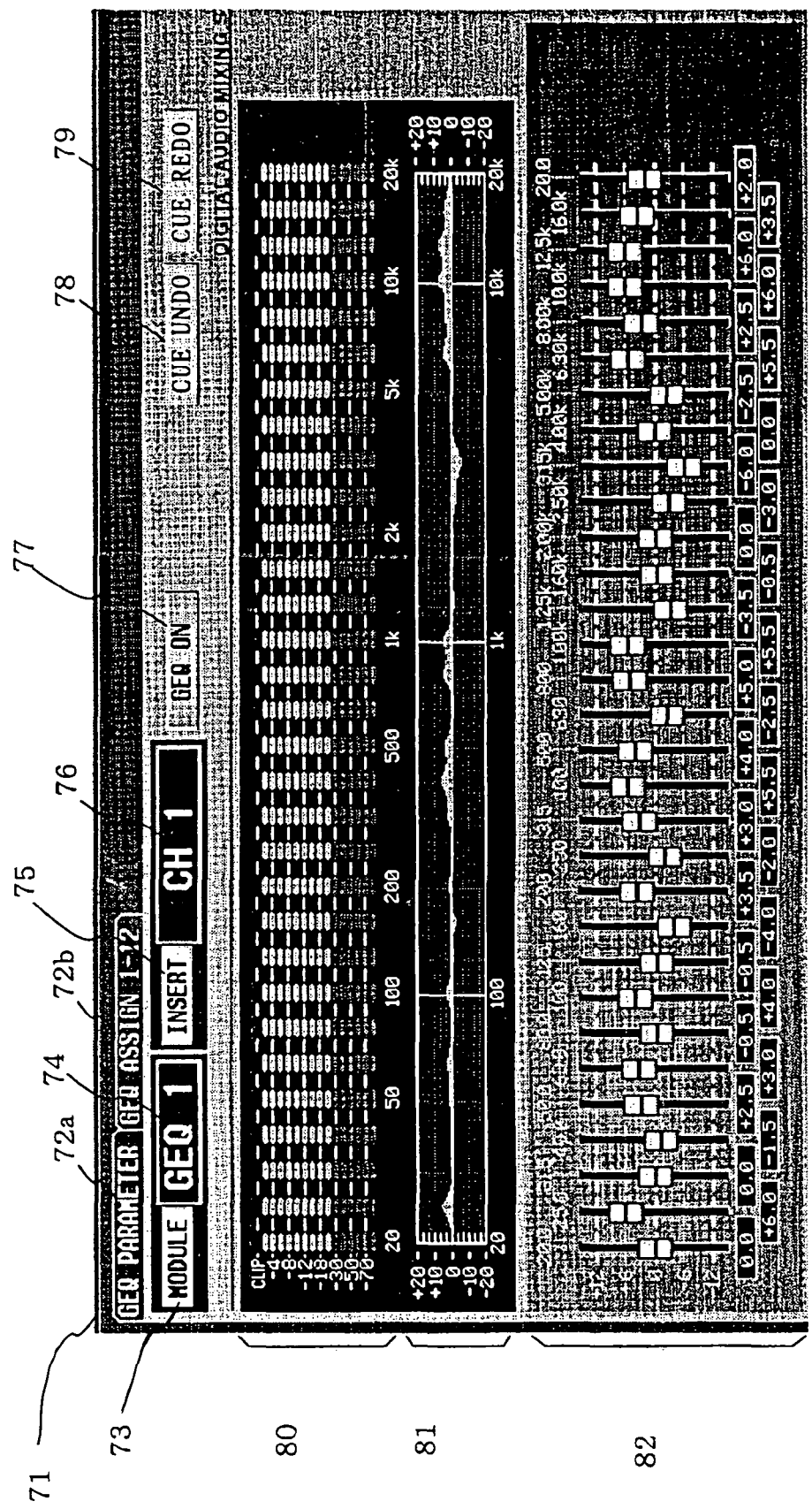
FIG. 5 is a diagram explanatory of a display screen showing a specific example of effecter editing/setting in the embodiment of FIG. 1.

FIG. 5 is a diagram explanatory of a display screen showing a specific example of effecter editing/setting. In the illustrated example, the effecter to be inserted is a monaural graphic equalizer (GEQ).

In the figure, reference numeral 71 represents a GEQ editing screen for editing parameters of the GEQ using a GUI (Graphical User Interface). The GEQ editing screen is displayed on the display 42 by the human operator operating a corresponding one of the plurality of switches in the display access section 41 shown in FIG. 3.

On the GEQ editing screen, a tab 72a indicates that the displayed screen is a GEQ parameter editing screen, and a tab 72b is a tab for shifting to a GEQ assign screen. Although not specifically shown, the GEQ assign screen is a screen that simultaneously indicates a total of 12 pieces of GEQ information contained in the digital mixer apparatus, and this screen allows the human operator to set channels into which the 12 GEQs are to be inserted, ON/OFF of the GEQs, etc. while comparing among them.

73 represents a GEQ selection button, and 74 represents a display section for displaying the selected GEQ(x) (or GEQ (x) in question).

As any of the cursor switches 45a-45d is operated, a focus (e.g., in the form of a red frame, although not shown) displayed on the GEQ editing screen 71 sequentially moves along display elements of buttons or GEQ faders to indicate which of the buttons or GEQ faders is being selected.

Once the human operator operates the ENTER switch 49 after having selected the GEQ selection button, a popup window is opened to display a list of effecters GEQ(1)-GEQ(12).

By operating any of the cursor switches 45a-45d to designate a desired effecter from the list and then operating the ENTER switch 49, the GEQ(x) to be edited can be selected. When the GEQ(x) to be edited is to be changed over to another, it is only necessary to select another GEQ than the current GEQ(x) stored in the current memory region.

The unique number x of the selected GEQ(x) is displayed on the display section 74, and displays of various buttons, faders, frequency characteristics, etc. on the GEQ editing screen 71 are all changed to displays corresponding to settings of the selected GEQ(x).

Reference numeral 75 represents an inserted-into-channel (i.e., insertion destination channel) selection button, and 76 represents a display section for displaying a specific or unique channel number (ICH(x)) of a channel currently set as an inserted-into channel for the currently-selected GEQ(x).

Popup window of the inserted-into-channel selection button 75 is opened to display a list of "CH1-CH48", "MIX1-MIX12" and "NO ASSIGN". When a channel other than the first channel CH1 has been selected, the selected channel is set as the inserted-into channel for the selected GEQ(x), and the number of the selected channel is displayed on the display section 76.

Further, reference numeral 77 represents an effecter-ON button ("GEQ ON") for turning on/off the function of the selected GEQ(x), which corresponds to the effecter-ON switch 11a(x) explained above in relation to FIG. 2. By designating the effecter-ON switch 11a(x) and operating the ENTER switch 49, it is possible to invert the ON/OFF state of the function of the selected GEQ(x). Alternatively, the function of the selected GEQ(x) can be turned off by operation of the DEC switch 46 and turned on by operation of the INC switch 47.

Even when the effecter-ON button 77 is OFF, settings (i.e., parameter values) of the selected GEQ(x) are prestored in the current memory region. Thus, processing of the selected GEQ (x) based on the settings can be promptly started by the DSP 60 of FIG. 4 in response to turning-on of the effecter-ON button 77. Whether the function of the selected GEQ(x) is ON or OFF can be identified by a color of a button that changes in accordance with the ON/OFF state.

Further, in FIG. 5, reference numeral 82 represents a display area of a plurality of equalizer faders (EQ faders) for setting a gain for each of 31 different frequency bands ranging from 20 Hz to 20 kHz.

81 represents an area showing, in a graph format, frequency characteristics of the selected GEQ(x) controlled in accordance with various parameters of the selected GEQ(x) stored in the current memory region.

Further, reference numeral 80 represents a display area for a frequency spectrum of a signal processed by and output from the selected GEQ(x). Specifically, the display area displays a frequency spectrum of a signal passing the insertion point where the selected GEQ(x) is inserted. When the effecter-ON button 77 is OFF, the selected GEQ(x) is placed in the "through" state, so that the frequency spectrum of the signal passing the insertion point when the input side of the selected GEQ(x) is directly coupled to the output side of the selected GEQ(x) is displayed in the display area.

Once the GEQ(x) is selected as the effecter 11(x) to be edited while the interlock function of the interlock control section 15 is set in the ON state by the mode section 14 of FIG. 1 (i.e., while the digital mixer apparatus is set in the interlock mode), the channel section having the selected effecter inserted therein is subjected to interlocked CUE-monitoring.

Such interlocked CUE-monitoring is different from CUE-monitoring executed in response to operation of the CUE switch 43d on the control panel. Therefore, the interlocked CUE-monitoring might sometimes become unintended CUE monitoring, and thus, it is desirable that a previous monitoring state before initiation of the interlocked CUE-monitoring be readily restorable.

For that purpose, there may be provided a CUE UNDO button 78 and CUE REDO button 79 as illustrated in FIG. 5. Monitoring state previously selected by the human operator can be restored by the human operator designating and inverting the CUE UNDO button 78. If, after that, the human operator wants to re-execute the interlocked CUE monitoring canceled via the CUE UNDO button 78, it is only necessary for the human operator to designate and invert the CUE REDO button 79.

FIGS. 6-10 are flow charts explanatory of behavior of the embodiment shown in FIG. 1.

The CPU 52 shown in FIG. 4 performs setting operation on the current memory region and transfer the settings to the DSP 60 in accordance with the control program, and then the DSP 60 performs characteristic control of signals and mixing of the controlled signals in accordance with the control program. The control program is arranged to perform predetermined initialization upon powering-on. "screen control task", "panel operator control task", "memory control task", "DSP control task" and "other control task" are then executed; each of these tasks is started up in response to a predetermined one of various events.

Figure 6A:
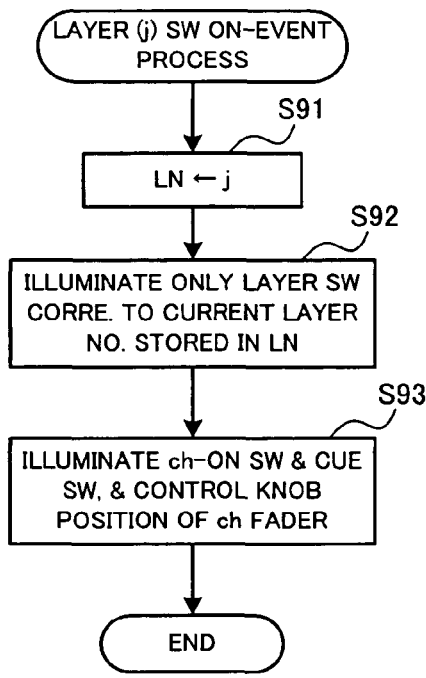
FIGS. 6A-6C are flow charts showing event processes performed in the embodiment shown in FIG. 1.

FIG. 6A is a flow chart of an ON-event process carried out in response to operation of the jth layer switch (j at a value "0" represents "Master", j at a value "1" represents "Layer 1", j at a value "2" represents "Layer 2", and so on) of the layer section 44.

At step S91, the number j of the operated layer switch is stored into a register LN that is provided for storing the current layer number.

At step S92, only the layer switch corresponding to the current layer number stored in the register LN is illuminated.

At following step S93, if the layer of the current layer number includes any channel currently in the ch-ON state, then the ch-ON switch 43a of the ch strip 43, to which the channel is assigned, is illuminated. If the layer of the current layer number includes any CUE channel currently in ON state, the CUE switch 43d of the ch strip 43, to which the channel is assigned, is illuminated. Further, the knobs 43c of the faders 43b of the ch strips 43, to which the channels included in the layer of the current layer number are assigned, are driven by motors in such a manner that the knobs take respective positions corresponding to tone volume parameters of the individual channels.

Figure 6B:
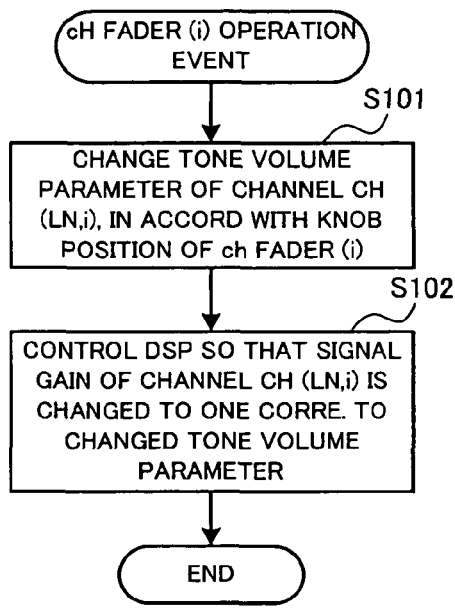

FIG. 6B is a flow chart of an operation event process carried out in response to operation of a ch fader (i) (ch fader 43b shown in FIG. 3); here, "i" represents the number (1, 2, 3, . . . , 12) of the ch strip to which the ch fader (i) belongs.

At step S101, the tone volume parameter stored in the current memory region, in association with the channel of the number CH (LN, i) included in the current layer stored in the register LN and assigned to the ch strip (i), is changed in accordance with the current position of the knob 43c of the ch fader (i).

At next step S102, the DSP 60 is controlled so that the signal gain of the channel of the number CH (LN, i) is changed to one corresponding to the changed tone volume parameter.

Figure 6C:
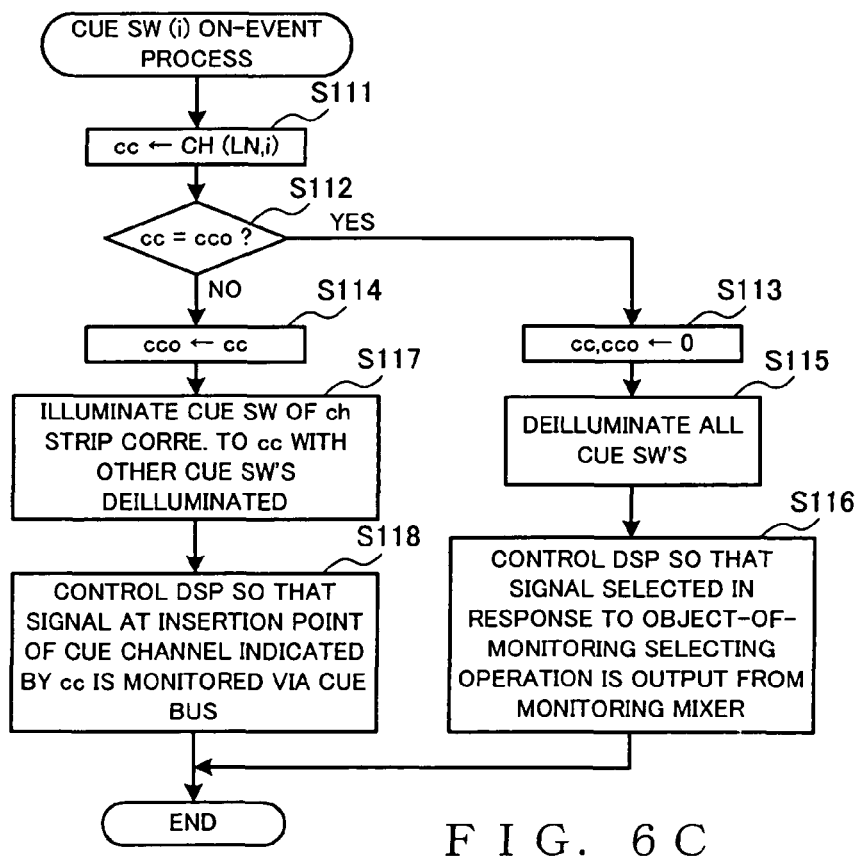

FIG. 6C is a flow chart of an ON-event process carried out in response to operation of the CUE switch (i) of the ch strip (i) (CUE switch 43d shown in FIG. 3).

At step S111, the channel number CH(LN, i) of the channel assigned to the ch strip (i), where the CUE switch (i) has been operated, is stored into a register cc provided for storing the number of the channel to be CUE-monitored. Here, the same channel number CH(LN, i) is allocated to both the input channel and the output channel, and if the channel number CH(LN, i) is "0", it indicates that no channel has been selected (NO ASSIGN).

At following step S112, a determination is made as to whether the number of the channel to be CUE-monitored, now stored in the register cc, is identical to the number of the channel stored in a register cco; here, the register cco is a register for storing the number of the last CUE-monitored channel.

If a YES determination has been made at step S112, it means that the CUE switch of the ch strip, to which the last CUE-monitored channel is assigned, has been operated twice in succession. Thus, in this case, the process of FIG. 6C moves on to step S113, where a value "0" is written into both of the registers cc and cco and the CUE ON/OFF state is inverted. When the number of the CUE channel is "0", it indicates a "CUE-OFF" state.

At step S115, all of the CUE switches 43d are deilluminated. At next step S116, the DSP 60 is controlled so that the monitoring mixer 18 outputs signals selected in accordance with object-of-monitoring selecting operation.

If, on the other hand, the numbers stored in the registers cc and cco are not identical to each other, the process goes to step S114, where the number of the CUE channel to be CUE-monitored this time is stored into the register cco. At next step S117, the CUE switch 43d of the ch strip 43, to which the channel indicated by the register cc is assigned, is illuminated with the other CUE switches 43d kept deilluminated.

At step S118, the CUE switches 4b or 7b in the individual input channel sections 4 or mix output channel sections 7 and monitoring mixer 18, currently under signal processing by the DSP 60, are controlled so that a signal at the CUE point of a single CUE channel indicated by the register cc are monitored via the CUE bus 6.

The processes shown in FIGS. 6A-6C are carried out when the respective start conditions have been satisfied, irrespective of whether or not effecter editing processes shown in FIGS. 7-10 are under way.

Figure 7:
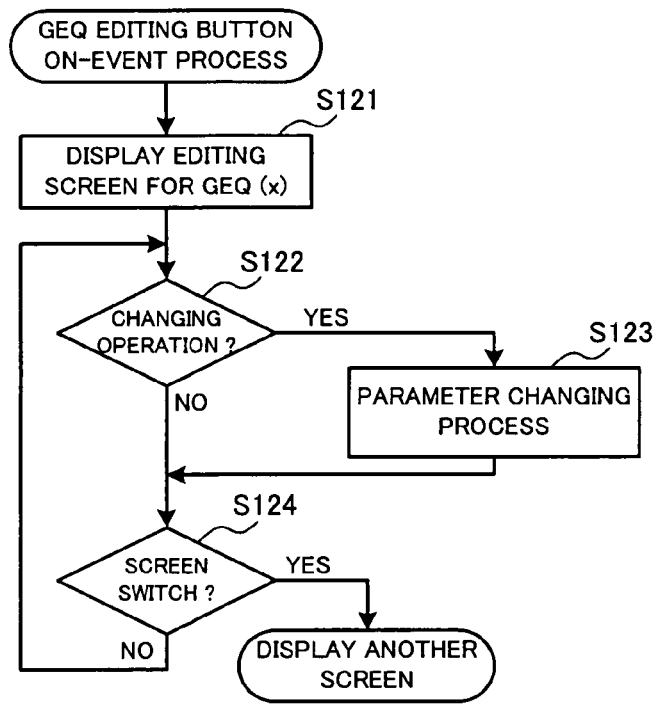
FIG. 7 is a flow chart showing an ON-event process performed in the embodiment shown in FIG. 1 in response to operation of a GEQ editing button.

FIG. 7 is a flow chart showing an ON-event process of a GEQ editing button. This ON-event process is started up when the GEQ editing button has been turned on a not-shown GEQ assign screen, or when the GEQ editing switch in the display access section 41 of FIG. 3 has been turned on.

At step S121, the GEQ editing screen 71 of FIG. 5 is displayed. Here, in a register x provided for storing the number x of the GEQ(x) to be edited, there is stored the number x (X=1, 2, . . . , 12) of the GEQ(x) last edited, for example, when the GEQ editing screen 71 was displayed last.

If any parameter changing operation has been detected at next step S122, the process of FIG. 7 proceeds to step S123 to carry out a parameter changing process, after which the process of FIG. 7 moves on to step S124. Here, the parameter changing operation is to operate any of the various buttons, faders, etc. on the GEQ editing screen 71 of FIG. 5 via any of the cursor switches 45a-45d, DEC switch 46, INC switch 47, rotary encoder 48, ENTER switch 9, etc.

Three major parameter changing operation and corresponding processes at step S123 will be described later with reference to FIGS. 8-10.

If no parameter changing operation has been detected at step S122, then the process of FIG. 7 goes to step S124, where the editing screen is switched over to another screen on condition that screen switching operation, performed via any of the switches etc. in the display access section 41 of FIG. 3, has been detected; if no such screen switching operation has been detected, then the process of FIG. 7 reverts to step S122.

Figure 8:
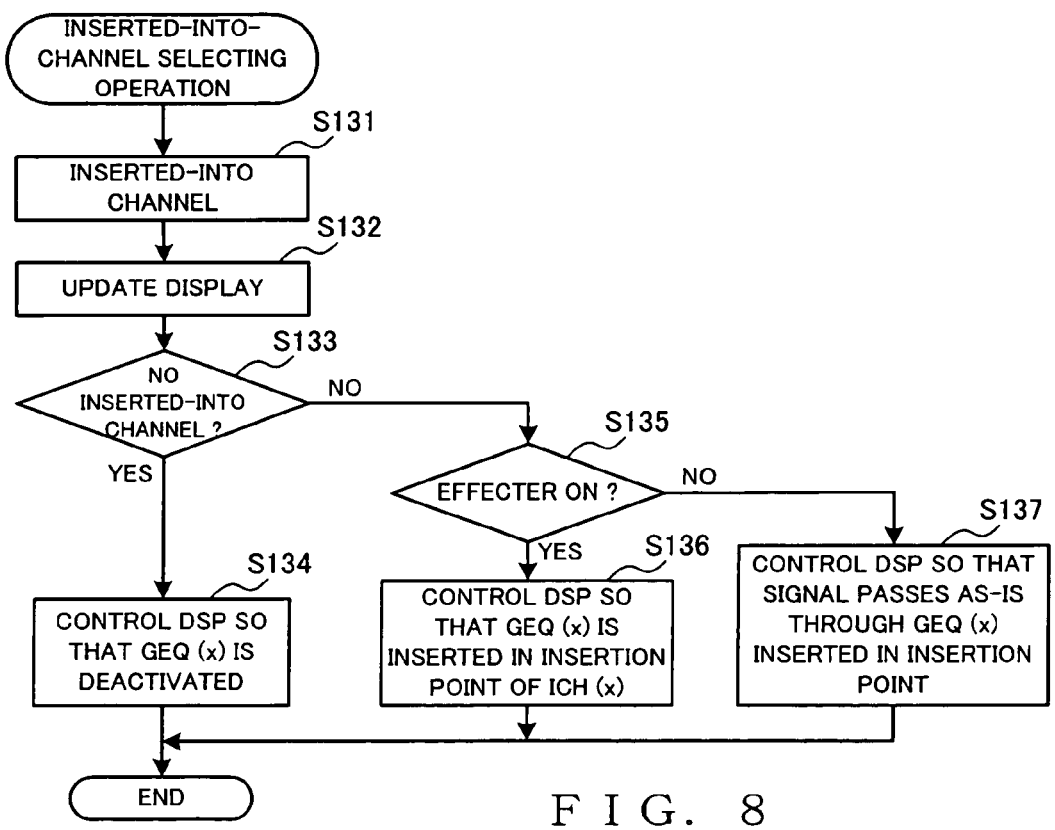
FIG. 8 is a flow chart of another event process performed in the embodiment shown in FIG. 1 in response to an event of inserted-into-channel selecting operation.

FIG. 8 is a flow chart of the event process performed in response to human operator's operation for selecting an inserted-into channel for the selected GEQ(x) as explained above in relation to the inserted-into-channel selection button 75 of FIG. 5.

At step S131, the number of the inserted-into channel selected by the selecting operation is stored into a register ICH(x) within the current memory region.

At next step S132, the display section 76 of FIG. 5 for displaying the number of the inserted-into channel is updated.

At following step S133, a determination is made as to whether or not the number of the inserted-into channel is zero (indicating "NO ASSIGN"). If the number of the inserted-into channel is zero, the process of FIG. 8 goes to step S134, where the DSP 60 is controlled so that the function of the selected GEQ(x) is deactivated.

If, on the other hand, the number of the inserted-into channel is not zero, the process of FIG. 8 branches to step S135, where a determination is made as to whether or not a register for indicating an ON/OFF state of the selected GEQ(x) is currently set in the ON state; note that this register is set ON/OFF via the effecter-ON button 77 shown in FIG. 5.

If the register is currently set in the ON state as determined at step S135, the process of FIG. 8 proceeds to step S136, where the DSP 60 is controlled so that the selected GEQ(x) is inserted in an insertion point of the channel section indicated by the register ICH(x).

If, on the other hand, the register is not currently set in the ON state as determined at step S135, the process of FIG. 8 proceeds to step S137, where the DSP 60 is controlled so that the signal passes as-is through the selected GEQ(x) although the selected GEQ(x) is caused to be inserted in the insertion point of the channel section indicated by the register ICH(x).

Even where the number of the inserted-into channel indicated by the register ICH(x) is zero (NO ASSIGN) as in the case of step S134 above, or even where the selected GEQ(x) is set in the OFF state as in the case of step S137, parameters necessary for the operation of the selected GEQ(x) are pre-stored in the current memory region.

Thus, if, after that, a valid channel number is set into the register ICH(x) or the selected GEQ(x) is set to ON, then signal processing by the selected GEQ(x) can be started promptly using the parameters stored in the current memory region.

Figure 9:
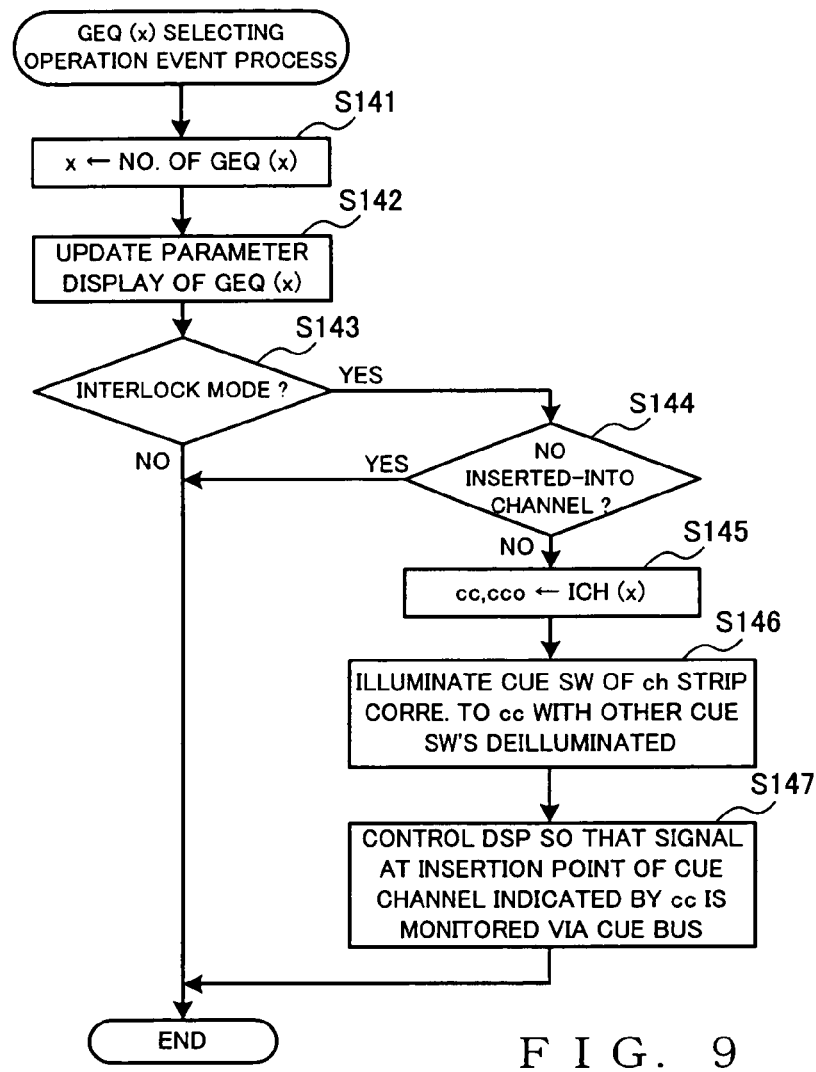
FIG. 9 is a flow chart of still another event process performed in the embodiment shown in FIG. 1 in response to an event of GEQ selecting operation.

FIG. 9 is a flow chart of the event process performed in response to operation for selecting a GEQ(x) to be edited as explained above in relation to the GEQ selection button 75 of FIG. 5.

At step S141, the number of the selected GEQ(x) is stored into the register x within the current memory region.

At next step S142, the displays of the various buttons, faders, graphs of frequency characteristics, etc. on the GEQ editing screen 71 are updated in accordance with the parameters of the selected GEQ(x), and the displayed contents of the display 74 are also updated in accordance with the number indicated by the register At following step S143, a determination is made as to whether the digital mixer apparatus is currently in the interlock mode to permit interlocked operation of the effecter (GEQ) function and CUE-monitor function or in the non-interlock mode to prevent the interlocked operation of the effecter (GEQ) function and CUE-monitor function.

Let it be assumed that either the interlock mode or the non-interlock mode has been set in advance. For example, a desired one of the interlock mode and non-interlock mode can be set by operation, by the human operator, on a preference setting screen (not shown) that is displayed on the display 42 in response to operation of a predetermined switch of the display access section 41.

If the digital mixer apparatus is not currently in the interlock mode as determined at step S143, the operational flow of FIG. 9 is brought to an end.

If, on the other hand, the digital mixer apparatus is currently in the interlock mode as determined at step S143, the process of FIG. 9 goes to step S144, where a further determination is made as to whether there is no inserted-into (i.e., insertion destination) channel for the selected GEQ(x) (i.e., ICH(x)=0 indicating "NO ASSIGN"). If there is any inserted-into channel for the selected GEQ(x) (i.e., ICH(x)≠0), the process of FIG. 9 proceeds to step S145. Here, "ICH(x)" indicates the number of the inserted-into channel of the GEQ (x) that was being the object of editing immediately before the ON event of the GEQ editing button of FIG. 7, or the number of the inserted-into channel set at step S131 through an event of the inserted-into-channel selecting operation of FIG. 8 after the ON event of the GEQ editing button.

At following step S145, the number of the inserted-into channel indicated by the register ICH(x) is written into both of the registers cc and cco, so that a process, similar to the On-event process of the CUE switch (i) described above with reference to FIG. 6C, is carried out using, as the channel section to be monitored, the inserted-into channel section indicated by the register ICH(x).

Namely, a signal at a take-out position (CUE point) of the inserted-into channel section indicated by the register ICH(x) is CUE-monitored in an interlocked relation with the selection of the GEQ(x). However, no determination corresponding to the determination of step S112 in FIG. 6C is made here, and operations of steps S146 and S147 corresponding to steps S117 and S118 are carried out.

In other words, irrespective of the state immediately before the event, the CUE switch 4b or 7b of the inserted-into channel section indicated by the register ICH(x) is turned on, the monitoring mixer 18 is set to the "CUE-ON" state, and the signal at the take-out position (CUE point) of the inserted-into channel section indicated by the register ICH(x) is output to the human operator's monitor via the CUE bus 6 and monitoring mixer 18.

As set forth above with reference to FIG. 1, when the digital mixer apparatus is currently in the interlock mode, the signal at the CUE point of the selected effecter 11(x) (GEQ(x)) is CUE-monitored, even if the effecter-ON switch 11a(x) (i.e., effecter button 77 of FIG. 5) of the selected effecter 11(x) (GEQ(x)) is in the OFF state.

If there is no inserted-into (i.e., insertion destination) channel for the selected GEQ(x) (i.e., ICH(x)=0 indicating "NO ASSIGN") as determined at step S144, the operational flow of FIG. 9 is brought to an end without any control being performed on the monitor section.

Figure 10:
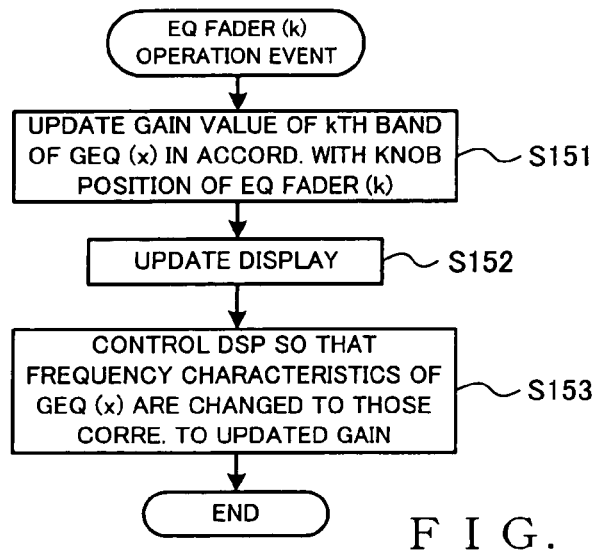
FIG. 10 is a flow chart of still another event process performed in the embodiment shown in FIG. 1 in response to an event of EQ fader operation.

FIG. 10 shows an example of editing operation for editing the parameters of the to-be-edited GEQ(x) so as to vary signal characteristics. More specifically, FIG. 10 is a flow chart showing an event process in response to operation of the knob of a kth EQ fader (k) among a total of 31 equalizer faders corresponding to 31 frequency bands on the GEQ editing screen 71 of FIG. 5.

At step S151, the gain parameter value for the kth frequency band of the selected GEQ(x), stored in the current memory region, is updated in accordance with a current position of the operated knob of the kth EQ fader (k). Then, at step S152, the graph display of the frequency characteristics of the selected GEQ(x) and display of the knob of a kth EQ fader (k) are updated.

At following step S153, the DSP 60 is controlled in accordance with the updated gain in such a manner that the frequency characteristics of the selected GEQ(x) are changed to those corresponding to the updated gain value.

Namely, the above-described embodiment is arranged in such a manner that, once a GEQ(x) is selected as an effecter 11(x) to be edited while the effecter editing setting section 12 is operating in the interlock mode, a signal of a channel section having the selected GEQ(x) inserted therein is output for the monitoring. In addition, the embodiment detects an ON event of the GEQ editing button as explained above with reference to FIG. 7, so that, if, when the effecter editing setting section 12 has been activated, there is any channel where the GEQ(x) to be edited is inserted, a signal of the channel section having the selected GEQ(x) inserted therein may be output for the CUE-monitoring purpose.

Further, the embodiment detects an event of inserted-into-channel selecting operation as explained above with reference to FIG. 8, so that, when an inserted-into (i.e., insertion destination) channel section has been selected for the GEQ(x) to be edited, a signal of the selected inserted-into channel section may be output for the monitoring.

Note that, if, in the interlock mode, the signal of the channel section having the selected GEQ(x) inserted therein has already been output for the monitoring purpose when the GEQ(x) is selected, in response to object-of-monitoring selecting operation, there is no particular need for performing new process on the monitor means.

Various cases where the interlock control section 15 of FIG. 1 controls the monitor setting section 17 to output the signal of the channel section having the to-be-edited GEQ(x) inserted therein include the above-mentioned case where there is no particular need for performing new process on the monitor means.

The above-described embodiment is arranged to permit selection of an inserted-into (insertion destination) channel for a desired effecter from among the 1st-48th input channels (ch1-ch48) and 1st-12th output channels (MIX1-MIX12). Alternatively, the inserted-into (insertion destination) channel for a desired effecter may be selected only from among the input channels, in which case the desired effecter is not inserted in any of the input channels (i.e., NO ASSIGN) unless any one of the input channels is selected as an object of insertion or inserted-into (i.e., insertion destination) channel.

Further, the above-described embodiment is arranged to set an effecter insertion position independently for each of the channels or set a same effecter insertion position collectively for all of the channels. Alternatively, an effecter insertion position may be set separately for each of the effecters.

Whereas the embodiment has been described above as including only the mix buses 5, as an output system of the digital mixer apparatus, for simplification of description. the output system of the digital mixer apparatus may include other buses, such as stereo mix buses or matrix buses. In such a case, a desired effecter may be inserted in a desired one of mix output channel sections 7 of the other buses.

Whereas the embodiment has been described in detail above only in relation to the "last CUE" mode, a similar function may be performed in the "mix CUE" mode. Namely, as channel sections of a same group are selected sequentially in the "mix CUE" mode, the plurality of channel sections selected are CUE-monitored simultaneously. For example, the illustrated example of FIG. 3 includes the group of the input channel sections 4 and the group of the mix output channel sections 7. In the case where there are provided the stereo mix sections and matrix output sections, they also constitute groups.

When, in the "CUE-OFF" state, the CUE switch 43*d* of any one of the ch strips has been operated, i.e. the channel assigned to that ch strip has been selected as an object of CUE-monitoring, the monitoring mixer 18 is shifted from the "CUE-OFF" state to the "CUE-ON" state, and also the CUE switch 4*b* or 7*b* of the selected channel is turned on.

When, in the "CUE-ON" state, the CUE switch 43*d* of any one of the ch strips, where the switch 43*d* is in the OFF state, has been turned on, i.e. another channel than the channel currently selected as the object of CUE-monitoring has been newly selected, the CUE switch 4*b* or 7*b* of the selected channel is kept in the ON state if the selected channel is of the same group as the channel so far selected as the object of the CUE-monitoring.

If, on the other hand, the selected channel is of a different same group from the channel so far selected as the object of CUE-monitoring, the CUE switch 4*b* or 7*b* of the selected channel is turned on while the CUE switch 4*b* or 7*b* of the channel so far selected as the object of CUE-monitoring is turned off.

Further, when, in the "CUE-ON" state, the CUE switch 43*d* of any one of the ch strips, where the switch 43*d* is in the ON state, has been turned on, i.e. the channel so far selected as the object of CUE-monitoring has been selected again, the CUE switch 4*b* or 7*b* of the selected channel is turned off. Namely, in the "mix CUE" mode too, the CUE switch 43*d* already set in the ON state is turned off once it is operated by the human operator. If, at that time point, there is no other channel where the CUE switch 4*b* or 7*b* is ON, the monitoring mixer 18 is shifted from the "CUE-ON" state to the "CUE-OFF" state.

Further, in the "mix CUE" mode, once a GEQ(x) is selected as an object of editing in the interlock mode when the monitoring mixer 18 is in the "CUE-OFF" state and the GEQ editing screen 71 is opened with the effecter editing setting section 12 activated, control is performed such that the "CUE-OFF" state is turned to the "CUE-ON" state, the CUE switch 4*b* or 7*b* of the inserted-into (i.e., insertion destination) channel section (indicated by ICH(x)) for the selected GEQ(x) is turned on and that a signal of the inserted-into channel is monitored. Such an operational sequence is substantially the same as that in the "last CUE" mode.

Further, once a GEQ(x) is selected as an object of editing in the interlock mode while the monitoring mixer 18 is set in the "CUE-ON" state (i.e., any one or more channels are being CUE-monitored) and the GEQ editing screen 71 is opened with the effecter editing setting section 12 activated, control is performed such that, irrespective of which group the inserted-into (i.e., insertion destination) channel section for the selected GEQ(x) belongs to, all of the CUE switches 4*b* or 7*b*, having so far been in the ON state, are turned off to clear the previous mix CUE state so that only the CUE switch of the inserted-into channel is turned on and that a signal of the inserted-into channel is subjected to the interlocked CUE-monitoring, with the channel as a first CUE channel in the "mix CUE" mode.

Note that, while the digital mixer apparatus is set in the non-interlock mode or when there is no inserted-into channel (ICH(x)=0, i.e. NO ASSIGN), the current CUE states (i.e., ON/OFF states of the CUE switches 4*b* or 7*b*, and CUE ON/OFF state of the monitoring mixer 18) are not changed.

Whereas the embodiment of the present invention has been described above as using a graphic equalizer as an example of an effecter to be inserted in a signal path of the signal processing section, the effecter to be inserted may be any other effecter than the graphic equalizer, such as a compressor, echo, reverberation or distortion, as long as the other effecter can change characteristics of signals.

Further, as regards an effecter for which no inserted-into channel is set (i.e., ICH(x)=0: NO ASSIGN), patching may be permitted as desired as in the normal patching. For example, a desired effecter may be inserted between a desired mix output channel section 7 and a desired input channel section 4, by patching the output of the mix output channel section 7 to the input side of the effecter by means of the output patch section 8 and patching the output side of the effecter to the input side of the desired input channel section by means of the input patch section 3.

Furthermore, the above-described embodiment is arranged to CUE-monitor a signal of an inserted-into channel for a selected effecter by controlling the CUE monitor function in an interlocked relation with the selection of the effecter. In an alternative, the inserted-into channel for the selected effecter may be selected as a normal monitoring object in an interlocked relation with the selection of the effecter to be edited. However, where the monitoring is implemented by the CUE monitoring function as in the present invention, the selected channel can be restored to a normal monitoring object without requiring particular design changes, because settings of the normal monitoring object are prestored in memory; therefore, the digital mixer apparatus of the invention can be used with an increased ease.

Furthermore, digital audio working station (DAW) software and the like executable on a personal computer are generally provided with a software mixer for mixing audio signals. The present invention is also applicable to such a software mixer.

What is claimed is:

1. A digital mixer apparatus including a plurality of input channels and arranged to mix signals processed in individual ones of the input channels, said digital mixer apparatus comprising:

a monitor section that outputs, for a monitoring purpose, the signals of one or more input channels selected, in response to a monitor channel selecting operation by a user, from among of the plurality of input channels;

a plurality of effecters;

an effecter insertion setting section that, in response to an insertion operation performed by the user for each of the plurality of effecters, inserts the effecter into an input channel designated by the insertion operation, from among the plurality of input channels, so that the inserted effecter imparts an effect to a signal being processed in the designated input channel in accordance with parameters of the inserted effecter;

an editing section that displays on a display a parameter editing screen for an effecter selected, in response to an effecter selecting operation by the user, from among the plurality of effecters, and edits one or more of the parameters of the selected effecter on the parameter editing screen, in response to an editing operation by the user;

a mode setting section that sets either an interlock mode that permits interlocked operation of one of the effecters and monitoring of the one or more input channels into which the effecter is inserted or a non-interlock mode that prevents interlocked operation of the effecter and the monitoring of the one or more input channels; and an interlock control section that, when one of the effecters has been selected via said editing section in response to the effecter selecting operation by the user, controls said monitor section to automatically select an input channel into which the selected effecter is inserted, and output, for monitoring purpose, a signal of the selected input channel if said digital mixer is in the interlock mode.

2. A digital mixer apparatus as claimed in claim 1 wherein the user instructs whether each effecter is to be inserted in at least one of the input channels, and if the user instructs an effecter to be inserted in at least one of the input channels, the effecter is inserted into the at least one of the input channels by said effecter insertion setting section, and if the user instructs no insertion for the effecter, the effecter is not inserted in any one of the input channels by said effecter insertion setting section, and wherein, even when one of said effecters has been selected via said editing section in response to the effecter selecting operation by the user while the digital mixer apparatus is set in the interlock mode, said interlock control section does not control said monitor section if the selected effecter is not inserted in any one of the input channels.

3. A digital mixer apparatus as claimed in claim 1 wherein a function of each effecter is turned ON or OFF in response to a switch operation by the user, and wherein, while said digital mixer apparatus is set in the interlock mode, said interlock control section controls, when any one of the effecters has been selected via said editing section in response to the effect selecting operation by the user, said monitor section to automatically output, for the monitoring purpose, the signal of the input channel, into which the selected effecter is inserted, irrespective of whether the function of the effecter has been turned ON or OFF.

4. An editing method for use in a digital mixer apparatus including a plurality of input channels and arranged to mix signals processed in individual ones of the input channels, said digital mixer apparatus further including: a monitor section that outputs, for a monitoring purpose, the signals of one or more input channels selected, in response to a monitor channel selecting operation by a user, from among of the plurality of input channels; and a plurality of effecter, said editing method comprising:

a step of, in response to an insertion operation performed by the user for each of the plurality of effecters inserting the effecter into an input channel designated by the insertion operation, from among the plurality of input channels, so that the inserted effecter imparts an effect to a signal being processed in the designated input channel in accordance with parameters of the inserted effecter;

an editing step of displaying on a display a parameter editing screen for an effecter selected, in response to an effecter selecting operation by the user, from among the plurality of effecters, and editing one or more of the parameters of the selected effecter on the parameter editing screen, in response to an editing operation by the user;

a step of setting either an interlock mode that permits interlocked operation of one of the effecters and monitoring of one or more input channels into which the effecter is inserted or a non-interlock mode that prevents interlocked operation of the effecter and monitoring of the one or more input channels; and a step of, when one of the effecters has been selected via said editing step in response to the effecter selecting operation by the user, controlling said monitor section to automatically select an input channel into which the selected effecter is inserted, and output, for monitoring purpose, a signal of the selected input channel if said digital mixer is in the interlock mode.

5. A non-transitory computer-readable storage medium containing a group of instructions for causing a computer to perform an editing method for use in a digital mixer apparatus including a plurality of input channels and arranged to mix signals processed in individual ones of the input channels, said digital mixer apparatus further including: a monitor section that outputs, for a monitoring purpose, the signals of one or more input channels selected, in response to a monitor channel selecting operation by a user, from among of the plurality of input channels; and a plurality of effecter, said editing method comprising: a step of, in response to an insertion operation performed by the user for each of the plurality of effecters, inserting the effecter into an input channel designated by the insertion designating operation, from among the plurality of input channels, so that the inserted effecter imparts an effect to a signal being processed in the designated input channel in accordance with parameters of the inserted effecter; a editing step of displaying on a display a parameter editing screen for an effecter selected, in response to an effecter selecting operation by the user, from among the plurality of effecters, and editing one or more of the parameters of the selected effecter on the parameter editing screen, in response to an editing operation by the user; a step of setting either an interlock mode that permits interlocked operation of one of the effecters and monitoring of one or more input channels into which the effecter is inserted or a non- interlock mode that prevents interlocked operation of the effecter and monitoring of the one or more input channels; and a step of, when any one of the effecters has been selected via said editing step in response to the effecter selecting operation by the user, controlling said monitor section to automatically select an input channel having into which the selected effecter is inserted therein, and an input channel having the selected effecter inserted therein, and output, for the monitoring purpose, a signal of the selected input channel if said digital mixer is in the interlock mode.

6. A digital mixer apparatus including a plurality of input channels, a plurality of mixing buses and a plurality of output channels corresponding to the mixing buses, said digital mixer apparatus mixing, via the mixing buses, signals processed in individual ones of the input channels and outputting the mixed signals via the output channels corresponding to the mixing buses, said digital mixer apparatus comprising:

a monitor section that outputs, for a monitoring purpose, the signals of one or more channels selected, in response to a monitor channel selecting operation by a user, from among of the plurality of input channels and the plurality of output channels;

a plurality of effecters;

an effecter insertion setting section that, in response to an insertion operation performed by the user for each of the plurality of effecters, inserts the effecter into a channel designated by the insertion operation, from among the plurality of input channels and the plurality of output channels, so that the inserted effecter imparts an effect to a signal being processed in the designated channel in accordance with parameters of the inserted effecter;

an editing section that displays on a display a parameter editing screen for an effecter selected, in response to an effecter selecting operation by the user, from among the plurality of effecters, and edits one or more of the parameters of the selected effecter on the parameter editing screen, in response to an editing operation by the user;

a mode setting section that sets either an interlock mode that permits interlocked operation of one of the effecters and monitoring of one or more input channels into which the effecter is inserted or a non-interlock mode that prevents interlocked operation of the effecter and monitoring of the one or more input channels; and an interlock control section that, when one of the effecters has been selected via said editing section in response to the effecter selecting operation by the user, controls said monitor section to automatically select a channel into which the selected effecter is inserted, and output, for monitoring purpose, a signal of the selected channel if said digital mixer is in the interlock mode.

7. A digital mixer apparatus as claimed in claim 6 wherein the user instructs, whether each effecter is to be inserted in at least one of the input channels, and if the user instructs effecter to be inserted in at least one of the input channels, the effecter is inserted into the at least one of the input channels by said effecter insertion setting section, and if the user instructs no insertion for the effecter, the effecter is not inserted in any one of the input channels by said effecter insertion setting section, and wherein, even when one of said effecters has been selected via said editing section in response to the effecter selecting operation by the user while said digital mixer apparatus is set in the interlock mode, said interlock control section does not control said monitor section if the selected effecter is not inserted in any one of the channels.

8. A digital mixer apparatus as claimed in claim 6 wherein a function of each effecter is turned ON or OFF in response to switch operation by the user, and wherein, while said digital mixer apparatus is set in the interlock mode, said interlock control section controls, when any one of the effecters has been selected via said editing section in response to the effect selecting operation by the user, said monitor section to automatically output, for the monitoring purpose, the signal of the channel, into which the selected effecter is inserted, irrespective of whether the function of the effecter has been turned ON or OFF.

9. An editing method for use in a digital mixer apparatus including a plurality of input channels, a plurality of mixing buses and a plurality of output channels corresponding to the mixing buses, said digital mixer apparatus mixing, via the mixing buses, signals processed in individual ones of the input channels and outputting the mixed signals via the output channels corresponding to the mixing buses, said digital mixer apparatus including: a monitor section that outputs, for a monitoring purpose, the signals of one or more channels selected, in response to a monitor channel selecting operation by a user, from among of the plurality of input channels and the plurality of output channels; and a plurality of effecters, said editing method comprising:

a step of, in response to an insertion operation performed by the user for each of the plurality of effecters, inserting the effecter into a channel designated by the insertion operation, from among the plurality of input channels and the plurality of output channels, so that the inserted effecter imparts an effect to a signal being processed in the designated channel in accordance with parameters of the inserted effecter;

an editing step of displaying on a display a parameter editing screen for an effecter selected, in response to an effecter selecting operation by the user, from among the plurality of effecters, and edits one or more of the parameters of the selected effecter on the parameter editing screen, in response to an editing operation by the user;

a step of setting either an interlock mode that permits interlocked operation of one of the effecters and monitoring of one or more input channels into which the effecter is inserted or a non-interlock mode that prevents interlocked operation of the effecter and monitoring of the one or more input channels; and a step of, when one of the effecters has been selected via said editing section in response to the effecter selecting operation by the user, controlling said monitor section to automatically select a channel into which the selected effecter is inserted, and output, for monitoring purpose, a signal of the selected channel if said digital mixer is in the interlock mode.

10. A non-transitory computer-readable storage medium containing a group of instructions for causing a computer to perform an editing method for use in a digital mixer apparatus including a plurality of input channels, a plurality of mixing buses and a plurality of output channels corresponding to the mixing buses, said digital mixer apparatus mixing, via the mixing buses, signals processed in individual ones of the input channels and outputting the mixed signals via the output channels corresponding to the mixing buses, said digital mixer apparatus including: a monitor section that outputs, for a monitoring purpose, the signals of one or more channels selected, in response to a monitor channel selecting operation by a user, from among of the plurality of input channels and the plurality of output channels; and a plurality of effecters, said editing method comprising: a step of, in response to an insertion operation performed by the user for each of the plurality of effecters, inserting the effecter into a channel designated by the insertion operation, from among the plurality of input channels and the plurality of output channels, so that the inserted effecter imparts an effect to a signal being processed in the designated channel in accordance with parameters of the inserted effecter; an editing step of displaying on a display a parameter editing screen for an effecter selected, in response to an effecter selecting operation by the user, from among the plurality of effecters, and edits one or more of the parameters of the selected effecter on the parameter editing screen in response to an editing operation by the user; a step of setting either an interlock mode that permits interlocked operation of one of the effecters and monitoring of one or more input channels into which the effecter is inserted or a non-interlock mode that prevents interlocked operation of the effecter and monitoring of the one or more input channels; and a step of, when any one of the effecters has been selected via said editing section in response to the effecter selecting operation by the user, controlling said monitor section to automatically select a channel into which the selected effecter is inserted and output, for monitoring purpose, a signal of the selected channel if said digital mixer is in the interlock mode.

* * * * *